United States Patent
Kuroda et al.

(10) Patent No.: US 9,809,688 B2
(45) Date of Patent: Nov. 7, 2017

(54) POLYESTER SHEET, POLYESTER MOLDED ARTICLE, POLYESTER RESIN MASTERBATCH

(75) Inventors: Yukitaka Kuroda, Hyogo (JP); Yoshihiro Kitaguchi, Osaka (JP); Toshiyuki Uehara, Osaka (JP)

(73) Assignee: TOMOYA CO., LTD., Saitama (JP)

( * ) Notice: Subject to any disclaimer, the term of this patent is extended or adjusted under 35 U.S.C. 154(b) by 982 days.

(21) Appl. No.: 13/392,546

(22) PCT Filed: Aug. 25, 2009

(86) PCT No.: PCT/JP2009/004097
§ 371 (c)(1),
(2), (4) Date: Jun. 1, 2012

(87) PCT Pub. No.: WO2011/024217
PCT Pub. Date: Mar. 3, 2011

(65) Prior Publication Data
US 2012/0231247 A1 Sep. 13, 2012

(51) Int. Cl.
| | | |
|---|---|---|
| *B32B 15/09* | (2006.01) | |
| *C08K 5/12* | (2006.01) | |
| *C08K 3/36* | (2006.01) | |
| *C09D 167/02* | (2006.01) | |
| *C08J 3/22* | (2006.01) | |

(Continued)

(52) U.S. Cl.
CPC .............. *C08J 3/226* (2013.01); *B32B 27/20* (2013.01); *B32B 27/36* (2013.01); *C08J 3/22* (2013.01); *C08K 3/36* (2013.01); *C08K 5/12* (2013.01); *B32B 2307/75* (2013.01); *B32B 2439/00* (2013.01); *C08J 2367/02* (2013.01); *C08J 2467/00* (2013.01); *Y10T 428/2495* (2015.01)

(58) Field of Classification Search
CPC . C09D 167/02; C08K 3/36; C08K 5/12; C08J 3/226; C08J 3/22; C08J 2367/02; C08J 2467/00; B32B 27/20; B32B 27/36; B32B 2307/75; B32B 2439/00; Y10T 428/2495
USPC ........................................................ 428/213
See application file for complete search history.

(56) References Cited

U.S. PATENT DOCUMENTS

| | | | | |
|---|---|---|---|---|
| 3,429,854 | A | * | 2/1969 | Rein et al. .................... 264/547 |
| 3,980,611 | A | * | 9/1976 | Anderson ............ C08K 3/0033 |
| | | | | 264/211 |
| 4,223,125 | A | * | 9/1980 | Bier et al. .................... 528/305 |

(Continued)

FOREIGN PATENT DOCUMENTS

| | | |
|---|---|---|
| EP | 00035835 A1 * | 6/1981 |
| JP | 10-292097 A | 11/1998 |
| JP | 4350152 B1 | 10/2009 |

*Primary Examiner* — Aaron Austin
*Assistant Examiner* — Michael Zhang
(74) *Attorney, Agent, or Firm* — Porzio, Bromberg & Newman P.C.

(57) ABSTRACT

There is prepared a polyester sheet having a surface layer in which 0.05 to 2.0% by weight of an ester compound, which is synthesized by using a polyvalent organic acid having three or more carboxyl groups and an aliphatic monohydric alcohol having eight or more carbon atoms, and 0.01 to 0.5% by weight of inert inorganic particles having an average particle diameter of 2 to 15 μm, are blended into a polyethylene terephthalate-based polymer. Accordingly, the polyester sheet has a rational balance between sliding properties and transparency.

9 Claims, 10 Drawing Sheets

(A)

(B)

(51) Int. Cl.
*B32B 27/20* (2006.01)
*B32B 27/36* (2006.01)

(56) References Cited

U.S. PATENT DOCUMENTS

| | | | | |
|---|---|---|---|---|
| 4,375,494 A | * | 3/1983 | Stokes | B32B 27/08 |
| | | | | 428/323 |
| 4,765,999 A | * | 8/1988 | Winter | B32B 27/36 |
| | | | | 264/171.13 |
| 6,036,905 A | * | 3/2000 | Park | C08G 63/20 |
| | | | | 264/165 |

* cited by examiner

| EXAMPLE NO. | 1 | 2 | 3 | 4 | 5 | 6 | | | | | | | | |
|---|---|---|---|---|---|---|---|---|---|---|---|---|---|---|
| COMPARATIVE EXAMPLE NO. | | | | | | | 1 | 2 | 3 | 4 | 5 | 6 | 7 | 8 |
| 1. SUBSTRATE LAYER SURFACE LAYER MATERIAL | PET | PET | PET | PET | PET | PET | PET | PET | PET | PET | PET | PETC | PET | PET |
| ESTER COMPOUND | TS | TS | PL | TS | TS | PL | PS | - | TS | PS | GLYCEROL DISTEARATE | PL | PL | PS |
| BLENDING AMOUNT OF ESTER COMPOUND wt% | 0.5 | 0.5 | 1 | 0.25 | 0.2 | 1 | 0.03 | - | 0.5 | 0.5 | 0.5 | 1 | 2.2 | 0.03 |
| SILICA 3 μm ppm | - | 1200 | - | - | - | - | - | - | - | - | - | - | 2000 | - |
| SILICA 5 μm ppm | 1200 | 300 | 1200 | 600 | 300 | - | 1000 | - | - | - | - | 1200 | | 500 |
| SILICA 12 μm ppm | 300 | - | 300 | 150 | 80 | - | 300 | - | - | - | - | 300 | 500 | - |
| 2. EVALUATION RESULTS | | | | | | | | | | | | | | |
| SLIDING PROPERTIES | ○ | ○ | ○ | ○ | ○ | △ | △ | ×× | △ | △ | × | ○ | ○ | △ |
| ANTI-BLOCKING PROPERTIES | ○ | ○ | ○ | ○ | ○ | ○ | ○〜△ | ×× | △ | ○ | ○ | ○ | ○ | △ |
| TRANSPARENCY | ○ | ○ | ○ | ○ | ◎ | ◎ | ○ | ◎ | ◎ | ◎ | ◎ | ○ | △ | ◎ |

Fig. 5

| EXAMPLE NO. | 7 | 8 | 9 | 10 | 11 | | |
|---|---|---|---|---|---|---|---|
| COMPARATIVE EXAMPLE NO. | | | | | | 9 | 10 |
| 1. SUBSTRATE LAYER SURFACE LAYER MATERIAL | PET | PET | PET | PET | PET | PET | PET |
| THICKNESS OF SUBSTRATE LAYER % | 70% | 70% | 70% | 70% | 70% | 70% | 70% |
| ESTER COMPOUND | NONE | NONE | NONE | NONE | NONE | NONE | NONE |
| SILICA | NONE | NONE | NONE | NONE | NONE | NONE | NONE |
| 2. SURFACE LAYER (BOTH SURFACES) MATERIAL | PETC | PETC | PETC | PETC | PETC | PETC | PETC |
| THICKNESS OF BOTH SURFACE LAYERS % | 30% | 30% | 30% | 30% | 30% | 30% | 30% |
| ESTER COMPOUND | TS | TS | TS | PL | PL | - | PS |
| BLENDING AMOUNT OF ESTER COMPOUND wt% | 0.5 | 0.2 | 1 | 2 | 1.5 | - | 0.03 |
| SILICA 3 μm ppm | - | 2500 | - | - | 3000 | - | 1200 |
| SILICA 5 μm ppm | 2500 | 700 | 2500 | 600 | 300 | 1200 | 300 |
| SILICA 12 μm ppm | 700 | - | 700 | 150 | | 300 | - |
| 3. EVALUATION RESULTS | | | | | | | |
| SLIDING PROPERTIES | ○ | ○ | ○ | ○ | ○ | △ | △ |
| ANTI-BLOCKING PROPERTIES | ○ | ○ | ○ | ○ | ○ | △ | ○ |
| TRANSPARENCY | ○ | ○ | ○ | ◎ | ○ | ○ | ○ |

Fig. 6

| EXAMPLE NO. | | 12 | 13 | 14 |
|---|---|---|---|---|
| COMPARATIVE EXAMPLE NO. | | | | |
| 1. SUBSTRATE LAYER | SUBSTRATE LAYER SURFACE LAYER MATERIAL | PET | PET | PET |
| | THICKNESS OF SUBSTRATE LAYER % | 80% | 80% | 80% |
| | ESTER COMPOUND | NONE | NONE | NONE |
| | SILICA | NONE | NONE | NONE |
| 2. SURFACE LAYER (BOTH SURFACES) | SURFACE LAYER (BOTH SURFACES) MATERIAL | PET | PET | PET |
| | THICKNESS OF BOTH SURFACE LAYERS % | 20% | 20% | 20% |
| | ESTER COMPOUND | TS | TS | TS |
| | BLENDING AMOUNT OF ESTER COMPOUND wt% | 0.2 | 0.2 | 0.2 |
| | SILICA 3 μm ppm | 1000 | | 800 |
| | SILICA 5 μm ppm | 400 | 800 | |
| | SILICA 12 μm ppm | | 200 | 200 |
| 3. EVALUATION RESULTS | SLIDING PROPERTIES | ○ | ○ | ○ |
| | ANTI-BLOCKING PROPERTIES | ○ | ○ | ○ |
| | TRANSPARENCY | ◎〜○ | ◎〜○ | ◎〜○ |

Fig. 7

POLYESTER SHEET, POLYESTER MOLDED ARTICLE, POLYESTER RESIN MASTERBATCH

CROSS REFERENCE TO RELATED APPLICATION

This is a National Stage of International Application No. PCT/JP2009/004097, filed Aug. 25, 2009, the disclosure of which Application is incorporated by reference herein.

TECHNICAL FIELD

The present invention relates to a polyethylene terephthalate-based sheet, and a molded article obtained by processing the sheet, such as a tray, a packaging container, and a sheet packaging material.

BACKGROUND ART

An unstretched polyester sheet is amorphous and excellent in transparency, so that the sheet is suitable for punching and bending. Therefore, with a heat-molding method, the polyester sheet is used for a wide range of applications including an outer transparent container such as a container for food and medicine, a blister pack for sundry goods, and a clear case.

A polyester sheet used as a material for molding and processing these packaging containers is cut into pieces, each of which has a predetermined width and length. Then, the cut pieces are stacked with one another to be supplied to a printing machine or a molding and processing machine one by one. However, when the sheet is poor in sliding properties and is subjected to blocking, it becomes difficult to surely supply the pieces of the sheet one by one. Sometimes a plurality of pieces are supplied at one time or in a misaligned state due to blocking. Accordingly, workability is lowered, and a defective rate of the molded and processed articles is increased.

A number of molded and processed packaging containers are stacked with one another for transportation. When commercial goods are packed in the packaging container, each of the stacked packaging containers needs to be picked up one by one. However, if the sheet material itself is poor in sliding properties or is subjected to blocking, it is not easy to smoothly pick out one from the stacked packaging containers. Sometimes several packaging containers are picked up at one time in an overlapped manner.

To solve the above problems, it is effective to improve surface properties of a sheet and further a molded article thereof so as to be smooth for sliding.

Specifically, to improve sliding properties, there are proposed a method in which a lubricant such as a silicone compound is applied on a sheet surface, and a method in which inorganic particles are added so that a sheet surface has microscopic asperity.

SUMMARY OF INVENTION

Technical Problem

However, in the method in which a lubricant is applied, various problems often arise in a manufacturing process that a coating applicator and a drier need to be provided, and that a downstream guide roller is smeared. In addition, problems regarding quality often arise such that unevenness of coating is often caused thereby to produce non-uniformity in sliding properties. Furthermore, another problem arises that printability is often reduced.

The method in which inorganic particles are added is especially effective with a stretched film in which surface projections are easily developed. However, an unstretched sheet has a problem in that asperities on a sheet surface are unlikely to be developed, so that a large amount of inorganic particles needs to be added to a level that satisfactory sliding properties can be achieved. As a result, the sheet may have satisfactory sliding properties but transparency of the sheet is sacrificed, causing another problem to arise when the sheet is used for an outer container which requires a high level of transparency.

The present invention has been accomplished in view of the above problems, and provides a polyester sheet that is excellent in sliding properties and favorable in transparency even if the polyester sheet is substantially unstretched, by improving surface properties.

Also, the present invention provides a molded article which is obtained by molding and processing the sheet with favorable sliding properties so as to be easily picked up one by one even when a plurality of molded articles are stacked with one another.

Solution to Problem

The above objects are achieved by the measures described below as a result of extensive research efforts by the inventors.

The present invention to achieve the above objects is a polyester sheet characterized in that 0.05 to 2.0% by weight of an ester compound, which is synthesized by using a polyvalent organic acid having three or more carboxyl groups and an aliphatic monohydric alcohol having eight or more carbon atoms, and 0.01 to 0.5% by weight of inert inorganic particles having an average particle diameter of 2 to 15 μm are blended into a polyethylene terephthalate-based polymer.

In the above invention, the polyester sheet to achieve the above objects is characterized in that a polyethylene terephthalate-based polymer is used as a substrate layer of the sheet, and that a polyethylene terephthalate-based polymer composition is used as at least one surface layer of the sheet, wherein the polyethylene terephthalate-based polymer composition is prepared by blending 0.05 to 2.0% by weight of an ester compound, which is synthesized by using a polyvalent organic acid having three or more carboxyl groups and an aliphatic monohydric alcohol having eight or more carbon atoms, and 0.01 to 0.5% by weight of inert inorganic particles having an average particle diameter of 2 to 15 μm, into a polyethylene terephthalate-based polymer.

The polyester sheet to achieve the above objects is characterized in that the thickness of the surface layer is 10% or more of the whole thickness.

In the above invention, the polyester sheet to achieve the above objects is characterized in that the substrate layer is a polyethylene terephthalate polymer or a polyethylene terephthalate copolymer, and the surface layer is a polyethylene terephthalate polymer or a polyethylene terephthalate copolymer.

In the above invention, the polyester sheet to achieve the above objects is characterized in that the substrate layer is a polyethylene terephthalate polymer, and the surface layer is a polyethylene terephthalate copolymer.

In the above invention, the polyester sheet to achieve the above objects is characterized in that the inert inorganic particles are spherical silica composed of primary particles.

The present invention to achieve the above objects is a polyester molded article characterized in that the article is obtained by processing the polyester sheet according to any of the above inventions.

The present invention to achieve the above objects is a polyester resin masterbatch, which is obtained by: blending 0.05 to 10.0% by weight of an ester compound, which is synthesized by using a polyvalent organic acid having three or more carboxyl groups and an aliphatic monohydric alcohol having eight or more carbon atoms, and 0.0 to 10.0% by weight of inert inorganic particles having an average particle diameter of 2 to 15 μm, into a polyethylene terephthalate-based polymer; and re-pelletizing the blended product.

Examples of the polyvalent organic acid in the above inventions preferably include polyvalent benzene carboxylic acid. When synthesizing an ester compound, it is desirable to use two or more of trimellitic acid, trimesic acid, pyromellitic acid, and benzene pentacarboxylic acid, as polyvalent benzene carboxylic acid. In the invention of the present application, it is preferable to exclude an ester compound of which pyrolysis amount is smaller than 8.0% by weight at 320° C.

One of the objects of the invention of the present application is to improve sliding properties of a sheet surface while keeping a transparent state, by maintaining a state in which the sheet material itself is amorphous. For this purpose, 0.05 to 2.0% by weight of an ester compound synthesized by using a polyvalent organic acid having three or more carboxyl groups (preferably benzene carboxylic acid) and an aliphatic monohydric alcohol having eight or more carbon atoms is blended into a polyethylene terephthalate-based polymer.

Thus, excellent transparency of the sheet can be maintained by controlling an added amount of the ester compound of the present application equal to, or smaller than, 2.0%. This is because, if the ester compound is added in an amount exceeding its solubility into the substrate layer, the ester compound should be precipitated so that the sheet becomes clouded. In the invention of the present application, by adding the ester compound in an amount of 2.0% or smaller, the sheet can be inhibited from becoming clouded due to precipitation.

In experiments conducted by the inventors of the present application, when an added amount of the ester compound was larger than 2.0%, the sheet was likely to be clouded. Furthermore, when a temperature of the sheet was increased to a melting point (65° C. to 70° C.) of the ester compound or higher, the ester compound was temporarily melted, so that the sheet was changed to be transparent. This also suggests that the sheet is clouded not by crystallization, but by precipitation of the ester compound.

Furthermore, sufficient sliding properties of the sheet itself can be achieved by combining the ester compound and the inert inorganic particles.

Also, in the invention of the present application, the reason why the content of the inorganic particles is limited to a small amount (0.01 to 0.5% by weight) is to inhibit the sheet from being clouded due to the difference in refractive index, and further to inhibit abrasion on surfaces of other sheets, which is caused by the inorganic particles projecting from the surface of a sheet when a plurality of pieces of the sheet are stacked with one another. In other words, a high level of transparency and slipperiness can be achieved by an excellent balance between the lubricating properties of an ester compound and the ability of inorganic particles to form surface asperities.

A chart of pyrolysis amount (volatile loss) at 320° C. of an ester compound that contains polyvalent benzene carboxylic acid, one of polyvalent organic acids used in the invention of the present application, is shown in FIG. 8 to FIG. 10 for reference. FIG. 8 shows a pyrolysis amount (volatile loss) of tristearyl trimellitate synthesized by using trimellitic acid and stearyl alcohol having 18 carbon atoms. The pyrolysis amount (volatile loss) at 320° C. is 31.8% by weight. FIG. 9 shows a pyrolysis amount (volatile loss) of trilauryl trimellitate synthesized by using trimellitic acid and lauryl alcohol having 12 carbon atoms. The pyrolysis amount (volatile loss) at 320° C. is 49.5% by weight. FIG. 10 shows a pyrolysis amount (volatile loss) of tetrastearyl pyromellitate synthesized by using pyromellitic acid and stearyl alcohol having 18 carbon atoms. The pyrolysis amount (volatile loss) at 320° C. is 52.5% by weight. That is, the pyrolysis amount of each of these materials is 8.0% by weight or more at 320° C.

Advantageous Effects of Invention

The present invention can provide a polyester sheet and a molded article thereof, which are excellent in sliding properties as well as anti-blocking properties without sacrificing transparency and processing properties such as printing performance and adhesion, by combining spherical silica and an ester compound having a higher aliphatic group. In addition, working efficiency of manufacturing a food packaging container, a clear case and the like can be improved. Furthermore, by providing a sheet having a multilayer structure which includes a thin surface layer containing a sliding agent and a substrate layer without containing a sliding agent, a slippery multilayer polyester sheet and a molded article thereof that are further excellent in transparency can be obtained.

BRIEF DESCRIPTION OF DRAWINGS

FIG. 5 is a table explaining evaluation results of the examples and comparative examples.

FIG. 6 is a table explaining evaluation results of the examples and comparative examples.

FIG. 7 is a table explaining evaluation results of the examples and comparative examples.

DESCRIPTION OF EMBODIMENTS

Embodiments of the present invention will be described below.

Figure 1:
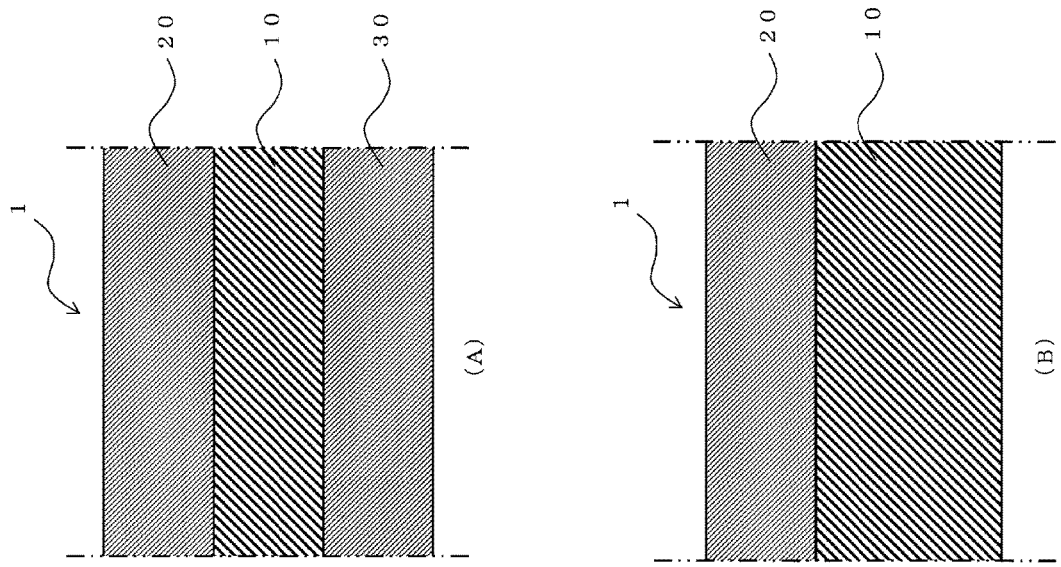
FIG. 1 is a partially enlarged cross-sectional view of a multilayer polyester sheet according to a first embodiment of the present invention.

As shown in FIG. 1A, a multilayer polyester sheet 1 according to a first embodiment of the present invention includes a substrate layer 10, and first and second surface layers 20 and 30 laminated on both outsides of the substrate layer 10.

The substrate layer 10 is composed of a polyethylene terephthalate polymer or a polyethylene terephthalate copolymer.

Especially in the present embodiment, as the substrate layer 10, polyethylene terephthalate (PET) is used which is obtained by reacting terephthalic acid and ethylene glycol in an esterification reaction and then in a condensation polymerization under vacuum.

The first and second surface layers 20 and 30 are composed of a polyester composition. The polyester composition is prepared by blending 0.05 to 2.0% by weight of an ester compound, which is synthesized by using a polyvalent organic acid having three or more carboxyl groups and an aliphatic monohydric alcohol having eight or more carbon atoms, and 0.01 to 0.5% by weight of inert inorganic particles having an average particle diameter of 2 to 15 µm, into a polyethylene terephthalate-based polymer. The combined thickness of the first and second surface layers 20 and 30 is set so as to be 10% or more of the whole thickness. Specifically, as the polyethylene terephthalate-based polymer in the first and second surface layers 20 and 30, a polyethylene terephthalate polymer or a polyethylene terephthalate copolymer is used.

Especially in the present invention, as a base polymer for the first and second surface layers 20 and 30, a polyester copolymer is used. The polyester copolymer is a copolymer which contains terephthalic acid and a glycol component that is a mixed component of 10 to 90% 1,4-cyclohexanedimethanol and 90 to 10% ethylene glycol. Accordingly, heat sealing properties and solvent adhesiveness can be improved.

Examples of the polyvalent organic acid having three or more carboxyl groups include trimellitic acid, trimesic acid, pyromellitic acid, and benzene pentacarboxylic acid. Anhydrides of trimellitic acid and pyromellitic acid are highly reactive, and especially preferably used for synthesizing an ester compound.

These polyvalent organic acids may be used independently or in combination of two or more thereof, as an acid component for synthesizing an ester compound. The ester compound synthesized by using a monohydric or dihydric organic acid can impart reduced sliding properties. To overcome the disadvantage, a content of silica particles or the like needs to be increased, which causes transparency to be sacrificed.

Examples of the aliphatic monohydric alcohol having eight or more carbon atoms include octyl alcohol, decyl alcohol, lauryl alcohol, myristyl alcohol, cetyl alcohol, stearyl alcohol, eicosyl alcohol and docosyl alcohol. These aliphatic monohydric alcohols may be used independently or in combination of two or more thereof, as an alcohol component for synthesizing an ester compound.

In addition, an amount of an ester compound to be blended in the first and second surface layers 20 and 30 is set to 0.05 to 2.0% by weight, but especially preferably to 0.1 to 1.0% by weight. In particular, when the blending amount of an ester compound is smaller than 0.05% by weight, sliding properties is less improved, thereby failing to obtain a desired sheet. When the blending amount is larger than 2.0% by weight, the melt viscosity of a molten polymer is extremely low, causing an extruded sheet to become unstable. Furthermore, while sliding properties are much improved, transparency is likely to be reduced.

Here, a concept of a "polyethylene terephthalate-based polymer" that constitutes the main component of the substrate layer 10 or the first and second surface layers 20 and 30 includes a polyethylene terephthalate polymer (polyethylene terephthalate), which is obtained by condensation polymerization of a terephthalic acid and ethylene glycol, and a polyethylene terephthalate copolymer, which is obtained by condensation polymerization of a terephthalic acid and a glycol component that consists of 90 to 10 mol % of ethylene glycol and 10 to 90 mol % of 1,4-cyclohexanedimethanol. In addition, in the polyethylene terephthalate copolymer, part of a terephthalic acid component may be substituted up to 10 mol % with dicarboxylic acid such as isophthalic acid, adipic acid, and naphthalene dicarboxylic acid. Similarly, part of an alcohol component in ethylene glycol may be substituted with diethylene glycol, hexamethylene glycol, propylene glycol, cyclohexanedimethanol, neopentyl glycol, butanediol, or the like.

In the multilayer polyester sheet 1 of the present first embodiment, an ester compound which is used in the surface layers 20 and 30 is especially characteristic. An aromatic group (a benzene ring) is introduced in a molecular structure of the ester compound, thereby to reduce perceived sliminess or stickiness inherent in an aliphatic group having eight or more carbons that develops sliding properties. For example, by comparing an ester compound that is called as glycerol distearate composed of glycerin and stearic acid, and tristearyl trimellitate ester that is an ester compound having a benzene ring, it is found that both have a stearyl group which is an aliphatic group, but the latter has less perceived sliminess. Therefore, the polyester sheet of the present first embodiment has less perceived sliminess, and has a dry touch. Furthermore, it was made clear that with the same blending amount, the latter has more improved sliding properties than the former, i.e., the sheet using glycerol distearate.

In addition, the inert inorganic particles are blended into the first and second surface layers 20 and 30 for the purpose of improving sliding properties. In this case, it is important to select a blending amount of particles that does not sacrifice transparency as well as a type of particles that has a proper average particle diameter. Examples of such inert inorganic particles include silica, calcium carbonate, talc, and kaolin, but especially preferred is spherical silica composed of primary particles. Spherical silica has a narrow particle diameter distribution, and is excellent in dispersibility into the base polymer. Furthermore, primary particles have an advantage, as compared with amorphous silica, in that a desired effect can be obtained by controlling a particle diameter and an added amount. Amorphous silica, which is a secondary particle formed by aggregated fine primary particles, is likely to be crushed or broken during molding. Therefore, an expected effect may not be obtained.

In particular, in the present first embodiment, 0.01 to 0.5 wt % of spherical silica having an average particle diameter of 2 to 15 µm measured by the Coulter Counter method is blended in the first and second surface layers 20 and 30. This enables the sheet 1 having excellent sliding properties to be manufactured.

It is also preferable that combination of two types of spherical silica, which are different in average particle diameter, be used to be blended, so that a sheet having favorable sliding properties can be obtained with a smaller blending amount. Especially preferred is the use of two types of spherical silica in combination having a different particle diameter distribution so that two peaks are clearly formed in the particle diameter distribution curve after blended. Specifically, 0.01 to 0.49 wt % of spherical silica having an average particle diameter of 2 to 5 μm and 0.01 to 0.2 wt % of spherical silica having an average particle diameter of 7 to 15 μm are blended. Furthermore, a combination in which a larger average particle diameter is 1.5 to 5 times of a smaller average particle diameter is preferred. When the blending amount of spherical silica is smaller than 0.01 wt %, effect of improved sliding properties is not sufficiently obtained, thereby making the manufactured sheet impractical. When the blending amount of spherical silica exceeds 0.5 wt %, the manufactured sheet has remarkable turbidity, thereby making it unpreferable.

Examples of the method of blending an ester compound or the like into the first and second surface layers 20 and 30 include a method of supplying powder or liquid of an ester compound or the like directly to an extruder, a method of supplying a masterbatch containing PET and an ester compound, and a method of supplying a masterbatch containing three components i.e., PET, an ester compound, and spherical silica. Any of them can be appropriately employed. The masterbatch containing the three components is desirably obtained by: blending 0.05 to 10.0% by weight of an ester compound, which is synthesized by using a polyvalent organic acid having three or more carboxyl groups and an aliphatic monohydric alcohol having eight or more carbon atoms, and 0.0 to 10.0% by weight of inert inorganic particles having an average particle diameter of 2 to 15 μm, into a polyethylene terephthalate-based polymer; and re-pelletizing the blended product.

Examples of the method of blending spherical silica into the first and second surface layers 20 and 30 include a method of supplying powder of spherical silica directly to an extruder, a method of supplying a masterbatch containing PET and spherical silica, and a method of supplying a masterbatch containing three components, i.e., PET, spherical silica, and an ester compound. Any of them can be appropriately employed.

Although there is described in the first embodiment a case in which the surface layers are laminated on both the outsides of the substrate layer 10 as shown in FIG. 1A, it may be configured such that the surface layer 20 is laminated on only one outside of the substrate layer 10 as shown in the exemplary structure of FIG. 1B.

Figure 2:
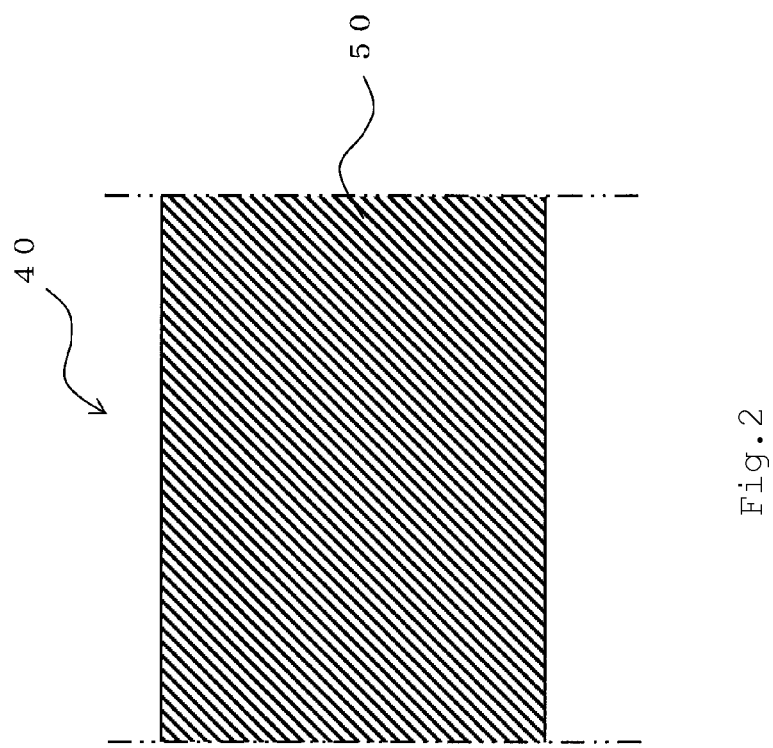
FIG. 2 is a partially enlarged cross-sectional view of a single-layer polyester sheet according to a second embodiment of the present invention.

Next, a single-layer polyester sheet 40 of the second embodiment of the present invention will be described with reference to FIG. 2. The polyester sheet 40 has a single-layer structure which includes only a substrate layer 50. The composition of the sheet 40 is the same as the surface layers 20 and 30 of the polyester sheet 1 of the first embodiment. Specifically, the sheet 40 is formed by blending 0.05 to 2.0% by weight of an ester compound, which is synthesized by using a polyvalent organic acid having three or more carboxyl groups and an aliphatic monohydric alcohol having eight or more carbon atoms, and 0.01 to 0.5% by weight of inert inorganic particles having an average particle diameter of 2 to 15 μm, into a polyethylene terephthalate-based polymer.

Therefore, the polyester sheet 40 of the present second embodiment also has sufficient surface sliding properties, similarly to the first embodiment.

EXAMPLES AND COMPARATIVE EXAMPLES

Examples and comparative examples will be described below. It is understood that the present invention is not limited to these examples.

<Methods for Evaluating Polyester Sheet>

With respect to the examples and comparative examples described in detail below, evaluation of polyester sheets was conducted in accordance with the following methods.

1. Sliding Properties (Angle at a Start of Sliding)

Figure 3:
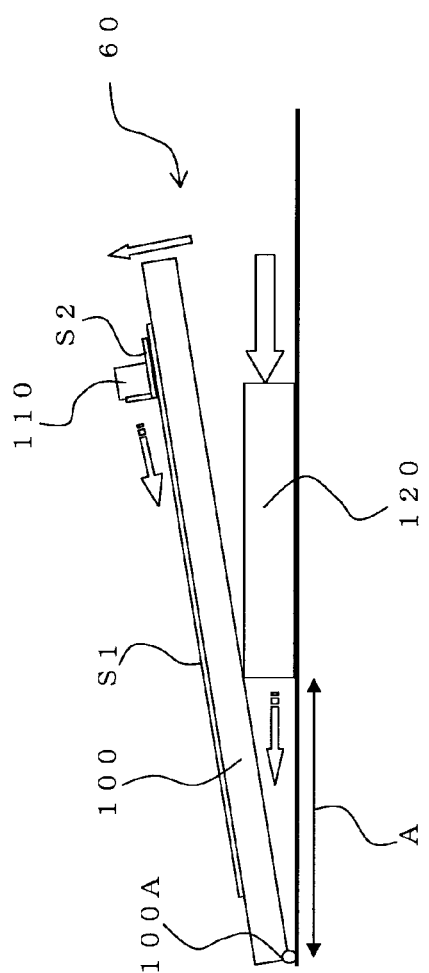
FIG. 3 is a side view showing a structure of the evaluation unit which is used for evaluating sliding properties of the polyester sheets according to examples of the present invention.

To evaluate sliding properties of a sheet, an evaluation unit 60 shown in FIG. 3 was used. The evaluation unit 60 is provided with a tilt plate 100 that is flat and rockingly fixed on a fulcrum 100A, a sliding element 110 placed on the tilt plate 100, and a support plate 120 inserted under the tilt plate 100. In evaluation, each sheet test piece S1 of the examples and comparative examples was spread on the tilt plate 100, and then the sliding element 110 covered with a sheet piece S2, which is the same as the sheet test piece S1, was gently placed on the sheet test piece S1. Next, the support plate 120 having a thickness of 13 mm was inserted from an opposite side to the fulcrum 100A under the tilt plate 100, and then gradually moved toward a side of the fulcrum 100A at a constant rate, thereby inclining the tilt plate 100. A distance A (mm) between the support plate 120 and the fulcrum 100A when the sliding element 110 started to slide was measured. The measured distance A was used to calculate a tilt angle θ in accordance with the formula: $\tan\theta = (13/A)$.

The size of the test piece sheet S1 placed on the tilt plate 100 was 80×170 mm, and the size of the bottom of the sliding element 110 was 15×15 mm. The weight of the sliding element 110 was 12 g.

The evaluation of sliding properties was determined based on an angle θ at a start of sliding as follows:
Circle: when a tilt angle is less than 20°;
Triangle: when a tilt angle is 20° or more and less than 25°;
Cross: when a tilt angle is 25° or more and less than 45°; and
Double Cross: when a tilt angle is 45° or more.

2. Anti-blocking Properties

Figure 4:
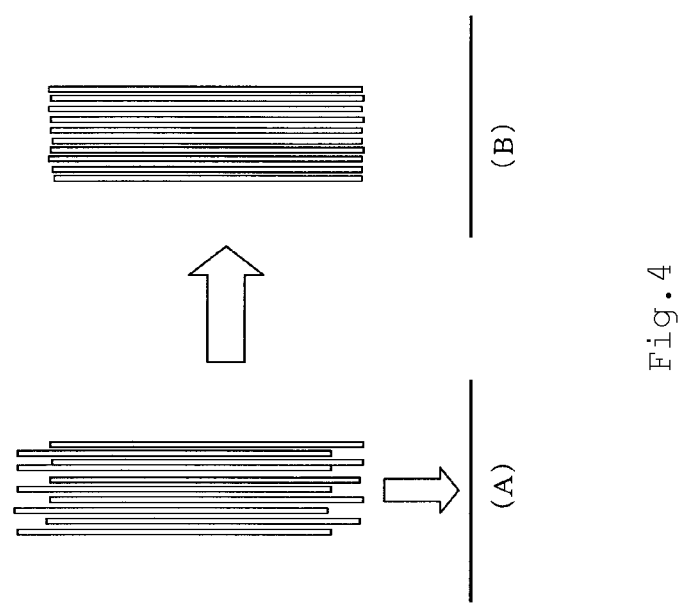
FIG. 4 is a schematic view showing a method of evaluating blocking resistance of the polyester sheets according to the examples of the present invention.
Figure 8:
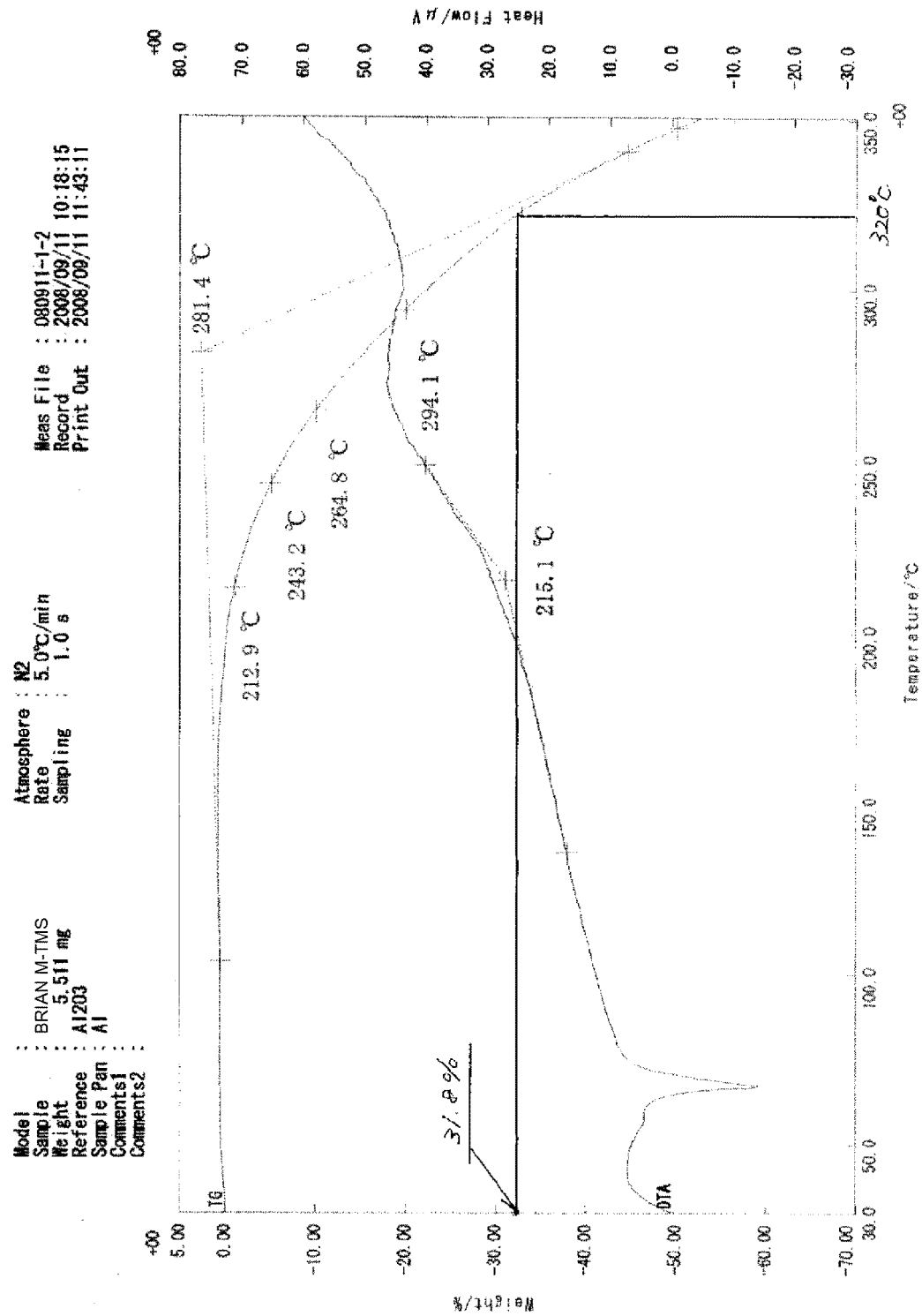
FIG. 8 is a chart showing a pyrolysis amount (volatile loss) of tristearyl trimellitate.
Figure 9:
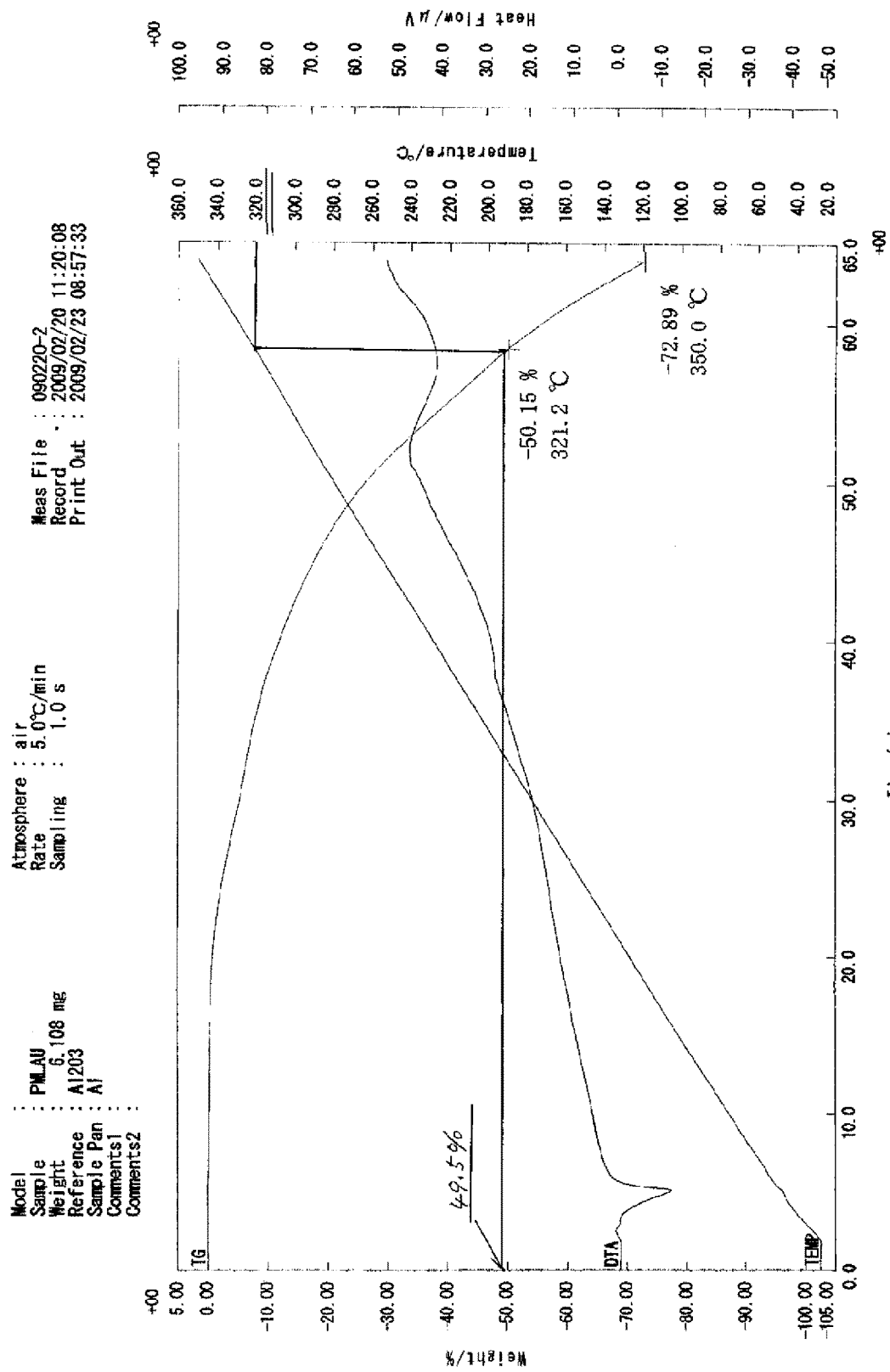
FIG. 9 is a chart showing a pyrolysis amount (volatile loss) of trilauryl trimellitate.
Figure 10:
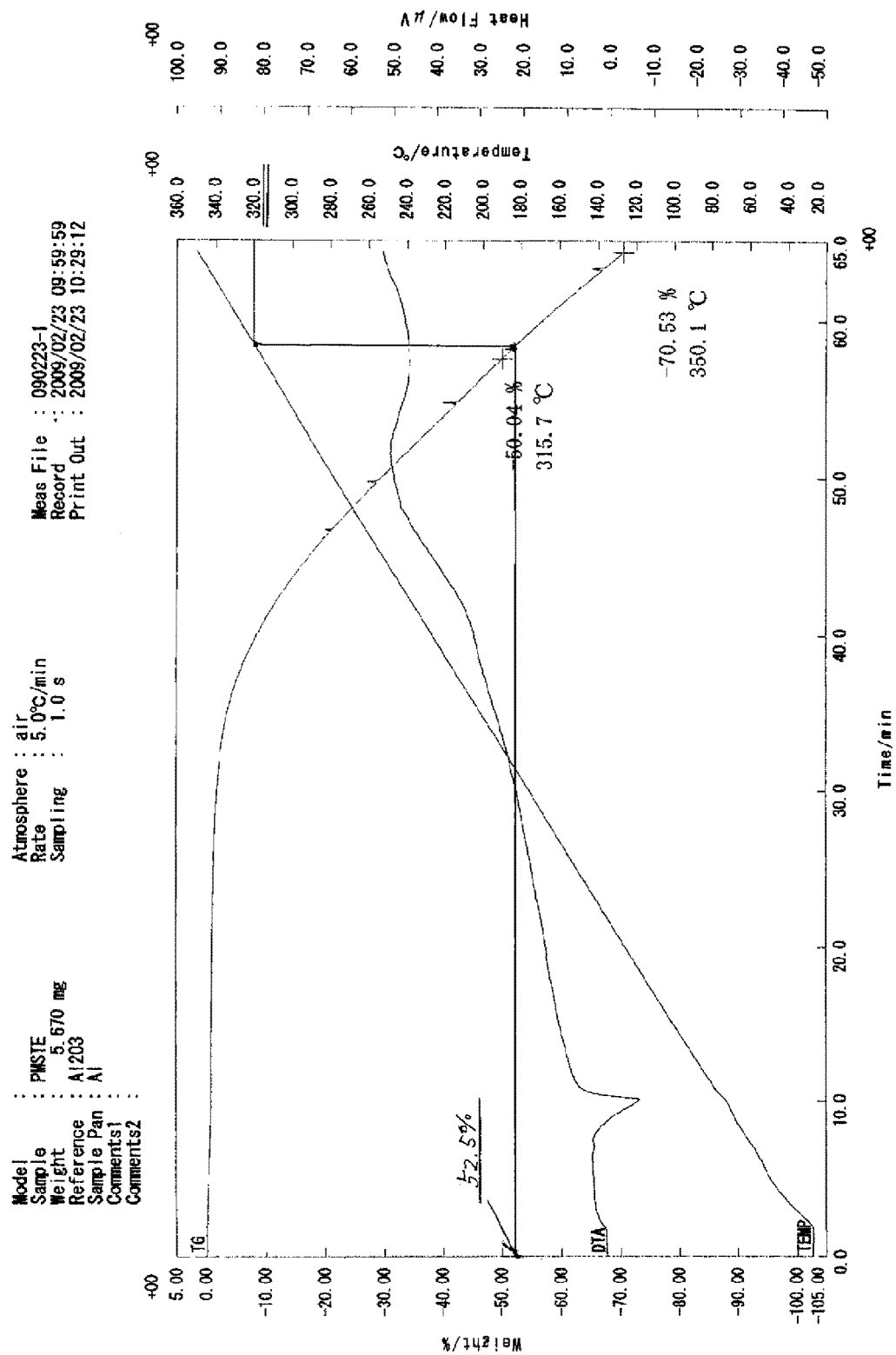
FIG. 10 is a chart showing a pyrolysis amount (volatile loss) of tetrastearyl pyromellitate.

To evaluate blocking resistance, each sheet of the examples and comparative examples was cut out into ten rectangular pieces, each of which has a length of 22 cm and a width of 11 cm. Then, the rectangular pieces were stacked with one another such that an end in a width direction (i.e., an edge on a long side) of each piece is displaced by approximately 1 cm from each other. Thereafter, a flat metal plate weighing 3.5 kg in total was placed on the group of stacked sheets for four days. After that, as shown in FIG. 4A, the group of sheets, each of which is displaced from each other and of which long side was horizontally directed, was turned so that they stand at a right angle. Subsequently, the vertically directed group of sheets was dropped from a height of 10 cm by gravity. Next, the dropped group of sheets was turned upside down, and the process of dropping the pieces from the same height again was repeated until a gap of 1 cm, which was previously displaced, disappeared and the ends of the pieces came into line with one another, as shown in FIG. 4B. The number of droppings until the ends came into line was used as a measurement of blocking resistance.

The evaluation of blocking resistance was determined in accordance with the number of droppings as follows:
Circle: when the number of droppings was 4 or less;
Triangle: when the number of droppings was 5 to 9;
Cross: when the number of droppings was 10 or more; and
Double cross: when the number of droppings was 60 or more.

3. Transparency

Transparency was determined by the degree of haze observed by naked eyes.

An evaluation index was as follows:

Double Circles: for the same level of transparency as that of the sheet consisting of only PET without a sliding agent added or a copolymer thereof;

Circle: when negligible haze was observed, but there is no problem in practical use; and Triangle: when minor haze was observed, which can cause problems in practical use.

<Explanation of Polyester Sheets of Examples>

Raw materials used in the examples will be described below.

1. Ester Compound

In a 3000 ml four-necked glass separable flask equipped with a stirrer, a thermometer, an air-cooled dephlegmator and a total condenser (a coiled condenser), and a material inlet, 2097 parts by weight of stearyl alcohol was placed, and heated with a mantle heater until dissolved. When the internal liquid temperature was increased to 100° C., 497 parts by weight of trimellitic anhydride was gently added under stirring, and brought into a state of homogeneous slurry. The temperature of the slurry was increased at 1° C. per minute. The slurry was changed to a clear liquid at around 140° C. Then, the obtained liquid was further heated to increase the temperature, and 83 parts by weight of distillate were obtained when the internal temperature reached 210° C. After the temperature of 220° C. was maintained for 30 minutes, heating with the mantle heater was stopped for cooling. The internal temperature was decreased to 70° C., and the reaction product was removed from the separable flask and placed in a cooled external container for solidification. Next, 2505 parts by weight of the solidified reaction product was ground to obtain a powder of ester compound (tristearyl trimellitate ester).

In the method similar to the above, 1950 parts by weight of tetrastearyl pyromellitate ester was obtained by reacting 327 parts by weight of pyromellitic dianhydride and 1623 parts by weight of stearyl alcohol.

Furthermore, in the method similar to the above, 1602 parts by weight of tetralauryl pyromellitate ester was obtained by reacting 364 parts by weight of pyromellitic dianhydride and 1242 parts by weight of lauryl alcohol.

In the tables described later, each of the obtained ester compounds is abbreviated as: TS for tristearyl trimellitate ester, PS for tetrastearyl pyromellitate ester, and PL for tetralauryl pyromellitate ester.

2. Polyethylene Terephthalate Resin (Abbreviated as PET in Tables)

A PET resin having an intrinsic viscosity of 0.82 was vacuum-dried for 7 hours or longer at 135° C., and the dried PET resin was used.

3. Polyethylene Terephthalate Copolymer Resin (Abbreviated as PETC in Tables)

A commercially available polyester copolymer resin was used, which is composed of terephthalic acid as a dicarboxylic acid component, and a random mixture of 67 mol % ethylene glycol and 33 mol % 1,4-cyclohexanedimethanol as a diol component. The polyester copolymer resin was vacuum-dried for 7 hours or longer at 65° C. The dried polyester copolymer resin was used.

4. Inorganic Inert Particles

The following three types of silica particles were used, each of which has a different average particle diameter. Such types of silica particles were a) spherical silica A (large particles) having an average particle diameter of 12 μm (Coulter Counter diameter), b) spherical silica B (medium particles) having an average particle diameter of 5 μm (Coulter Counter diameter), and c) spherical silica C (small particles) having an average particle diameter of 3 μm (Coulter Counter diameter).

Examples 1 to 6 and Comparative Examples 1 to 8

As shown in the table of FIG. 5, 14 types of single-layer sheets in total were prepared as Examples 1 to 6 and Comparative Examples 1 to 8. Specifically, a material mixture of a PET resin or a PETC resin, an ester compound, and spherical silica in a blending amount shown in the table was supplied into three twin-screw extruders from a hopper. The cylinder was heated to a temperature of 260° C. to 285° C. to melt the mixture. Then, the molten mixture was extruded from a T-die by a three-layer coextrusion method, and cooled with a cooling roll at 35° C. to prepare a sheet having a thickness of 0.2 mm.

As clear from FIG. 5, favorable results were obtained in Examples 1 to 6 with a balance among sliding properties, anti-blocking properties and transparency.

Comparative Example 1 and Comparative Example 8, which contain a small amount of an ester compound, did not have a satisfactory level of sliding properties. Comparative Examples 3 to 6, in which only an ester compound was added and silica particles were not added, did not have a satisfactory level of sliding properties similarly to Comparative Examples 1 and 8. In Comparative Example 7 which contains a larger amount of an ester compound, minor haze was observed.

Examples 7 to 11 and Comparative Examples 9 to 10

As shown in a table of FIG. 6, seven types of polyester sheet having a multilayer structure in total were prepared as Examples 7 to 11 and Comparative Examples 9 to 10. In these sheets, the substrate layer contained only a PET material with no sliding agent blended, and both surface layers contained PETC as a base polymer with an ester compound and spherical silica blended.

As understood from FIG. 6, favorable results were obtained in Examples 7 to 11 with a balance between sliding properties, anti-blocking properties and transparency. It is clear that when PETC was used as a base polymer of the surface layer, the increased blending amounts of an ester compound and silica had more favorable sliding properties, as compared with the cases in FIG. 5 in which PET was used.

Comparative Example 9 without an ester compound added in the surface layer resulted in reduction in both sliding properties and anti-blocking properties. Comparative Example 10 with a small blending amount of an ester compound resulted in insufficient sliding properties.

Examples 12 to 14

As shown in a table of FIG. 7, three types of polyester sheets having a multilayer structure were prepared as Examples 12 to 14. The substrate layer contained only a PET material with no sliding agent blended, and both surface layers contained a PET material as a base polymer with an ester compound and spherical silica blended.

In Examples 12 to 14, the combined thickness of both surface layers was set to be 20% of the whole thickness. Accordingly, transparency was further improved as compared with the cases in FIG. 6 (in which the combined thickness of both surface layers was 30% of the whole thickness).

INDUSTRIAL APPLICABILITY

The present invention relates to a polyester sheet which is used for various applications. Especially, the polyester sheet of the present invention has unlimited thickness and can be used for a variety of applications including a polyester molded container.

The invention claimed is:

1. A polyester sheet comprising 0.2 to 2.0% by weight of an ester compound, which is synthesized by using a polyvalent organic acid having three or more carboxyl groups with a benzene ring, and an aliphatic monohydric alcohol having eight or more carbon atoms, and 0.01 to 0.5% by weight of inert inorganic particles, said inorganic particles comprises a first set of inert inorganic particles and a second set of inert organic particles, the first set of inorganic particles having a first average particle diameter of 2 to 5 μm and the second set of inert inorganic particles having a second average particle diameter of 7 to 15 μm , said ester compound and said inorganic particles are blended into a polyethylene terephthalate-based polymer, wherein the polyester sheet is amorphous.

2. A polyester sheet comprising a polyethylene terephthalate-based polymer is used as a substrate layer of the sheet, and an amorphous polyethylene terephthalate-based polymer composition is used as at least one surface layer of the sheet, wherein the polyethylene terephthalate-based polymer composition is prepared by blending 0.2 to 2.0% by weight of an ester compound, which is synthesized by using a polyvalent organic acid having three or more carboxyl groups with a benzene ring, and an aliphatic monohydric alcohol having eight or more carbon atoms, and 0.01 to 0.5% by weight of inert inorganic particles, said inorganic particles comprises a first set of inert inorganic particles and a second set of inert organic particles, the first set of inorganic particles having a first average particle diameter of 2 to 5 μm and the second set of inert inorganic particles having a second average particle diameter of 7 to 15 μm.

3. The polyester sheet according to claim 2, wherein a thickness of the surface layer is 10% or more of the whole thickness.

4. The polyester sheet according to claim 2, wherein the substrate layer is a polyethylene terephthalate polymer or a polyethylene terephthalate copolymer, and the surface layer is a polyethylene terephthalate polymer or a polyethylene terephthalate copolymer.

5. The polyester sheet according to claim 2, wherein the substrate layer is a polyethylene terephthalate polymer, and the surface layer is a polyethylene terephthalate copolymer.

6. The polyester sheet according to claim 1, wherein the inert inorganic particles are spherical silica composed of primary particles.

7. A polyester molded article wherein the article is obtained by processing the polyester sheet according to claim 1.

8. The polyester sheet according to claim 1, wherein 0.2 to 1.0% by weight of the ester compound is blended into the polyethylene terephthalate-based polymer.

9. The polyester sheet according to claim 2, wherein 0.2 to 1.0% by weight of the ester compound is blended into the polyethylene terephthalate-based polymer.

\* \* \* \* \*